(12) United States Patent
Park

(10) Patent No.: US 12,510,764 B2
(45) Date of Patent: Dec. 30, 2025

(54) GLASSES WITH SCREWLESS HINGE

(71) Applicant: DUNUN Co., Ltd., Daegu (KR)

(72) Inventor: Jong Sung Park, Daegu (KR)

(73) Assignee: DUNUN Co., Ltd., Daegu (KR)

( * ) Notice: Subject to any disclaimer, the term of this patent is extended or adjusted under 35 U.S.C. 154(b) by 415 days.

(21) Appl. No.: 18/004,493

(22) PCT Filed: Jul. 16, 2020

(86) PCT No.: PCT/KR2020/009358
§ 371 (c)(1),
(2) Date: Jan. 6, 2023

(87) PCT Pub. No.: WO2022/014744
PCT Pub. Date: Jan. 20, 2022

(65) Prior Publication Data
US 2023/0251505 A1 Aug. 10, 2023

(30) Foreign Application Priority Data
Jul. 16, 2020 (KR) ........................ 10-2020-0087873

(51) Int. Cl.
*G02C 5/22* (2006.01)
(52) U.S. Cl.
CPC ................................. *G02C 5/2209* (2013.01)
(58) Field of Classification Search
CPC .................................................. G02C 5/2209
USPC ................................ 351/153, 90, 97; 16/228
See application file for complete search history.

(56) References Cited

U.S. PATENT DOCUMENTS

| | | | | |
|---|---|---|---|---|
| 5,098,180 A | * | 3/1992 | Tobey | G02C 1/08 351/85 |
| 5,894,336 A | * | 4/1999 | Baldissarutti | G02C 5/2254 351/153 |
| 2002/0054272 A1 | * | 5/2002 | Ebata | G02C 5/2209 351/111 |

FOREIGN PATENT DOCUMENTS

| | | | | |
|---|---|---|---|---|
| EP | 0695962 A1 | | 2/1996 | |
| EP | 2207058 A1 | * | 7/2010 | ............ G02C 5/008 |
| JP | 10020260 A | * | 1/1998 | |
| JP | 11142794 A | * | 5/1999 | |
| JP | 4004191 B2 | | 11/2007 | |
| KR | 10-2019-0000982 A | | 1/2019 | |
| WO | WO-2021020881 A1 | * | 2/2021 | |

* cited by examiner

*Primary Examiner* — George G. King
(74) *Attorney, Agent, or Firm* — NKL Law; Jae Youn Kim

(57) ABSTRACT

Proposed are glasses with screwless hinges. The glasses include an upper frame supporting upper edges of lenses, lower frames supporting lower edges of the lenses and coupled to the upper frame, temples which are folded and unfolded with respect to the upper frame, and eyeglass hinges which are arranged between the upper frame and the temples and support end parts of the upper frame and end parts of the temples such that the temples are folded and unfolded with respect to the upper frame, wherein a first connection part formed on each of the end parts of the upper frame and a second connection part formed on each of the end parts of the temples are fitted and coupled to each of the eyeglass hinges.

4 Claims, 9 Drawing Sheets

GLASSES WITH SCREWLESS HINGE

CROSS-REFERENCE TO RELATED APPLICATIONS

This application is a national stage of International Application No. PCT/KR2020/009358, filed on Jul. 16, 2020, which claims priority from Korean Patent Application No. 1020200087873, filed on Jul. 16, 2020, the entire contents of which are hereby incorporated by reference.

TECHNICAL FIELD

The present disclosure relates generally to glasses with screwless hinges without need for screw fastening. More particularly, the present disclosure relates to glasses with screwless hinges in which a first connection part of an end part of an upper frame and a second connection part of an end part of a temple are fitted and coupled to an eyeglass hinge such that the first connection part and the second connection part intersect with each other so that the glasses can be easily assembled without need for screw fastening, and a support pillar coupled to the second connection part is formed to have a polygonal cross section so that the stable folding and unfolding of the temple are maintained despite repeated use thereof.

BACKGROUND ART

In general, glasses are an optical instrument used to correct a user's eyesight or to protect eyes from strong ultraviolet rays, wind, and dust, or used as fashion accessories.

Generally, glasses include a pair of rims which is an eyeglass frame to which lenses are coupled, a bridge which connects the rims to each other, temples which are hinged to the opposite sides of the rims and are held on a wearer's ears, and nose pads.

The conventional rims and the temples are screwed to hinges formed on opposite sides of the rims such that the temples are freely folded or unfolded, and to assemble and disassemble these components, a separate tool such as a screwdriver is required, so it takes a lot of time to assemble glasses.

In addition, the assembly of components of glasses is complicated, thereby making it difficult to manufacture the glasses, and a skilled technician who can join the components by argon welding is required, and further, welding is difficult and thus defects may be increased. Additionally, since a skilled technician who can perform argon welding is required, high labor costs are incurred and the unit price of a product is increased, thereby resulting in decrease in productivity.

Meanwhile, due to the repeated folding and unfolding of temples when a user uses glasses for a long time, screws fastened to hinges loosen, causing the temples to shake.

That is, a folded or unfolded state of the temples is not maintained.

Accordingly, it is urgently required to develop glasses with screwless hinges in which the glasses can be easily assembled without need for separate screw fastening and the stable folding and unfolding of the temples are maintained despite repeated use thereof.

SUMMARY

The present disclosure has been made to solve the above problems and is intended to enable glasses to be easily assembled without need for screw fastening.

In addition, the present disclosure is intended to reduce costs and increase productivity through a simplified manufacturing process.

Furthermore, the present disclosure is intended to maintain the stable folding and unfolding of a temple despite repeated use thereof by forming a support pillar to have a polygonal cross section.

The present disclosure relates to glasses with screwless hinges, the glasses including: an upper frame supporting upper edges of lenses;
  lower frames supporting lower edges of the lenses and coupled to the upper frame;
  temples which are folded and unfolded with respect to the upper frame; and
  eyeglass hinges which are arranged between the upper frame and the temples and support end parts of the upper frame and end parts of the temples such that the temples are folded and unfolded with respect to the upper frame,
  wherein a first connection part formed on each of the end parts of the upper frame and a second connection part formed on each of the end parts of the temples are fitted and coupled to each of the eyeglass hinges such that the first connection part and the second connection part intersect with each other so that the glasses are easily assembled without need for screw fastening.

In addition, the eyeglass hinge of the present disclosure may include:
  a support pillar having the second connection part (31) horizontally wound on an outer peripheral surface thereof;
  an upper plate which is arranged on the support pillar, with a first fitting groove being formed in an upper surface of the upper plate; and
  a lower plate which is arranged under the support pillar, with a second fitting groove being formed in a lower surface of the lower plate.

In addition, the first connection part of the present disclosure may be bent to vertically surround the support pillar and may be inserted into the first fitting groove and the second fitting groove, and
  the second connection part may be coupled to the outer peripheral surface of the support pillar by an elastic force.

Furthermore, according to the present disclosure, a shape of a cross section of the support pillar cut horizontally may be a polygonal shape, and when the second connection part coupled to the outer peripheral surface of the support pillar rotates, edges of the outer peripheral surface of the support pillar may act as stoppers to prevent shaking of the second connection part.

In addition, the second connection part of the present disclosure may surround and be coupled to at least two non-adjacent edges formed on the outer peripheral surface of the support pillar.

Furthermore, the second connection part of the present disclosure may be bent in a U shape, and may surround and be coupled to two parallel outer surfaces of the support pillar.

In addition, a winding groove may be formed in the outer peripheral surface of the support pillar of the present disclosure.

Furthermore, the winding groove of the present disclosure may be formed in a V shape, and the second connection part may be in point contact with the winding groove so as to minimize friction therebetween.

In addition, each of the first fitting groove and the second fitting groove of the present disclosure may be formed to be inclined at a predetermined angle with respect to a horizontal direction.

According to the present disclosure, the glasses with screwless hinges can easily be assembled without need for screw fastening.

In addition, according to the present disclosure, it is possible to reduce costs and increase productivity through a simplified manufacturing process.

Furthermore, according to the present disclosure, the support pillar is formed to have a polygonal cross section, and thus the stable folding and unfolding of the temple are maintained despite repeated use thereof.

DESCRIPTION OF EMBODIMENTS

Figure 1:
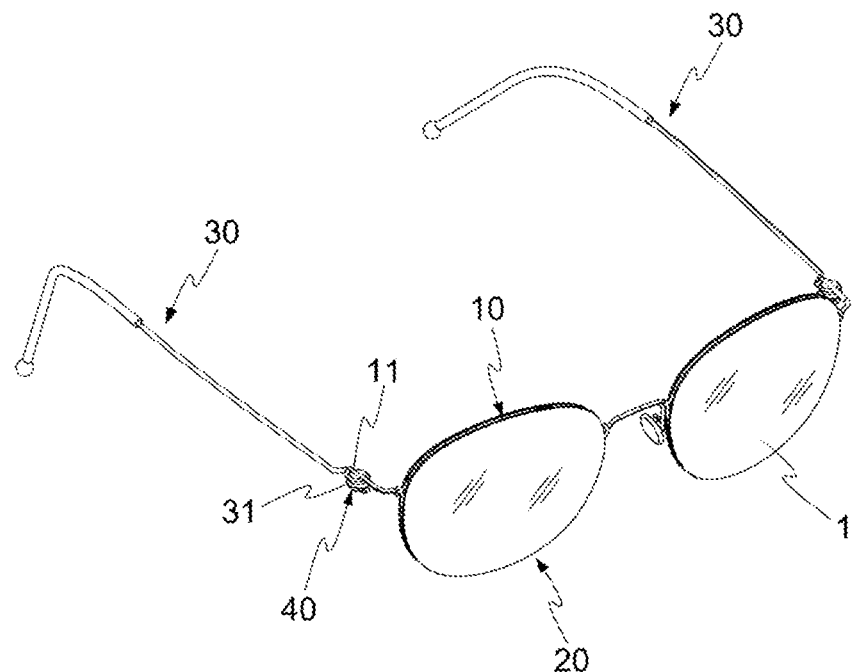
FIG. 1 is a perspective view of glasses with screwless hinges according to a first embodiment of the present disclosure.

Hereinafter, embodiments of the present document will be described with reference to the accompanying drawings. However, this is not intended to limit the technology described in this document to specific embodiments, and it should be understood that various modifications, equivalents, and/or alternatives of the embodiments of this document are included. In connection with the description of the drawings, like reference numerals may be used for like components.

In addition, expressions such as "first" and "second" used in this document may modify various elements regardless of order and/or importance, and are used only to distinguish one element from another element but do not limit the corresponding components. For example, "first part" and "second part" may represent different parts regardless of order or importance. For example, without departing from the scope of the claims described in this document, the first component may be named as the second component, and similarly, the second component may also be named as the first component.

In addition, terms used in this document are used only to describe specific embodiments, and may not be intended to limit the scope of other embodiments. A singular expression may include a plural expression unless the context clearly dictates otherwise. Terms used herein, including technical or scientific terms, may have the same meanings as commonly understood by those skilled in the art described in this document. Among the terms used in this document, terms defined in a general dictionary may be interpreted to have the same or similar meaning as meaning in the context of the related art, and unless explicitly defined in this document, are not interpreted as deal or excessively formal meanings. In some cases, even terms defined in this document cannot be construed to exclude the embodiments of the present document.

Figure 2:
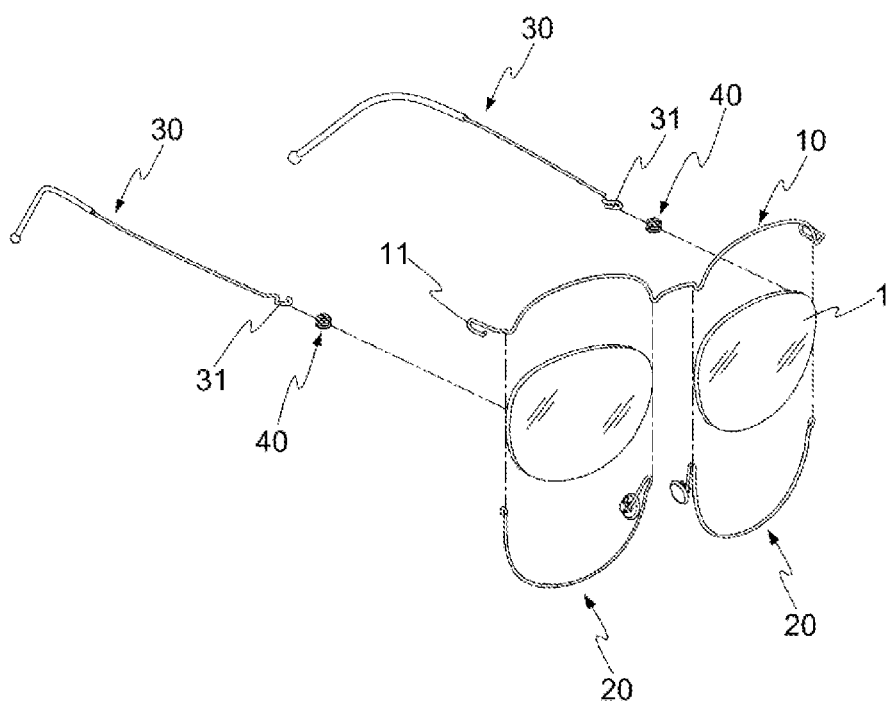
FIG. 2 is an exploded perspective view of the glasses with screwless hinges according to the first embodiment of the present disclosure.
Figure 3A:
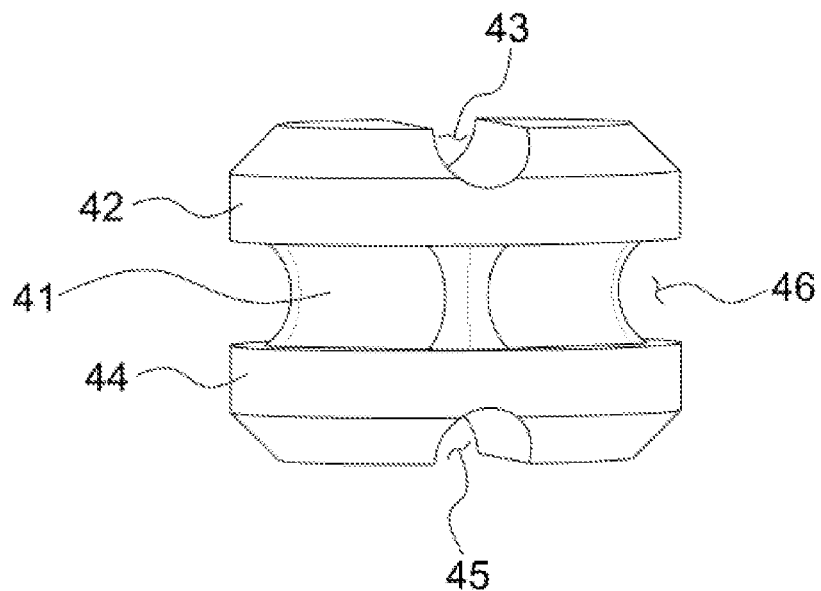
FIGS. 3(a) and 3(b) illustrate views of an eyeglass hinge according to the first embodiment of the present disclosure.
Figure 3B:
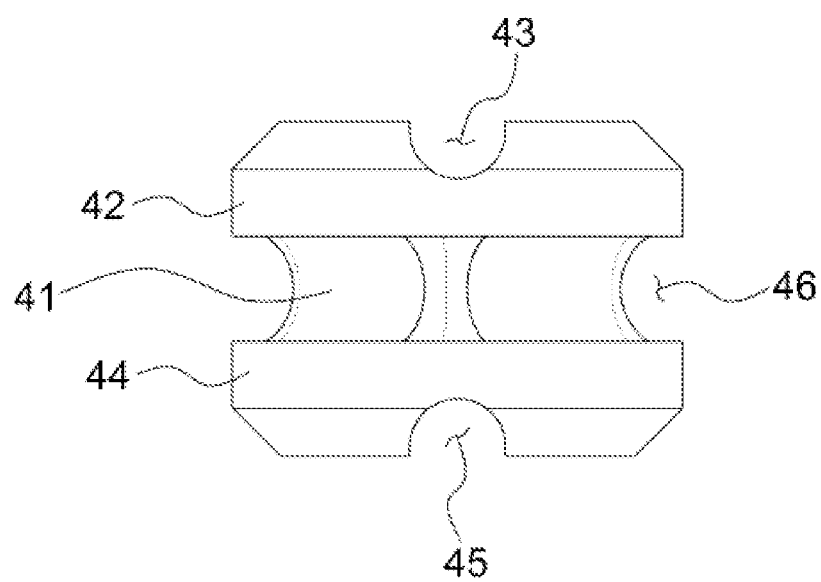

FIG. 1 is a perspective view of glasses with screwless hinges according to a first embodiment of the present disclosure, FIG. 2 is an exploded perspective view of the glasses with screwless hinges according to the first embodiment of the present disclosure, and FIGS. 3(a) and 3(b) illustrate views of an eyeglass hinge according to the first embodiment of the present disclosure.

Glasses with screwless hinges according to the present disclosure include lenses 1, an upper frame 10, lower frames 20, temples 30, and eyeglass hinges 40 as main components.

The upper frame 10 supports the upper edge of each of the lenses 1, and a first connection part 11 bent to be coupled to each of the eyeglass hinges 40 is formed on an end part of the upper frame 10.

Each of the lower frames 20 supports the lower edge of the lens 1, and is detachably coupled to the upper frame 10.

A buffer pad for supporting the glasses on a user's nose is installed on the lower frame 20.

Each of the temples 30 is coupled to the upper frame 10 through the eyeglass hinge 40, and can be folded or unfolded with respect to the upper frame 10.

The eyeglass hinge 40 is arranged between the upper frame 10 and the temple 30 and supports an end part of the upper frame 10 and an end part of the temple 30 such that the temple 30 can be folded and unfolded with respect to the upper frame 10.

As illustrated in FIGS. 3 to 4, the eyeglass hinge 40 includes a support pillar 41, an upper plate 42, and a lower plate 44 as main components.

A second connection part 31 is horizontally wound on the outer peripheral surface of the support pillar 41.

The upper plate 42 is arranged on the support pillar 41, and a first fitting groove 43 is formed in the upper surface of the upper plate 42 in a horizontal direction.

The lower plate 44 is arranged under the support pillar 41, and a second fitting groove 45 is formed in the lower surface of the lower plate 44 in a horizontal direction.

The first connection part 11 is bent in a U shape to surround the support pillar 41 in a vertical direction and is inserted into the first fitting groove 43 and the second fitting groove 45.

By fitting the first connection part 11 into the first fitting groove 43 and the second fitting groove 45 to be coupled thereto, the eyeglass hinge 40 is stably supported by the eyeglass frame without need for screw fastening.

The second connection part 31 formed on an end part of the temple 30 is formed in a horizontal direction in a ring shape having an approximate C shape.

While the second connection part 31 is coupled to the eyeglass hinge 40 in a horizontal direction, the first connection part 11 is coupled to the eyeglass hinge 40 in a vertical direction such that the first connection part 11 intersects with the second connection part 31.

The second connection part 31 is coupled to the first connection part 11 inside the first connection part 11 such that the second connection part 31 intersects with the first connection part 11. Accordingly, the second connection part 31 is prevented from being removed from the first connection part 11.

Accordingly, in the glasses with screwless hinges according to the present disclosure, the first connection part 11 and the second connection part 31 are fitted and coupled to the eyeglass hinge 40 such that the first connection part 11 and the second connection part 31 intersect with each other, thereby enabling the glasses to be easily assembled without need for screw fastening.

In addition, a portion at which a U-shaped bent part formed on the first connection part 11 and the second connection part 31 intersect with each other is formed, and thus when the temple 30 rotates at a predetermined angle or more, the second connection part 31 interferes with the first connection part 11. As a result, it is possible to limit the rotation angle of the temple 30 so that the temple 30 is not rotated beyond a predetermined angle.

That is, the intersecting structure of the first connection part 11 and the second connection part 31 serves as a stopper when the temple 30 rotates, and thus a user is prevented from excessively rotating the temple 30 when unfolding the temple 30.

Figure 4A:
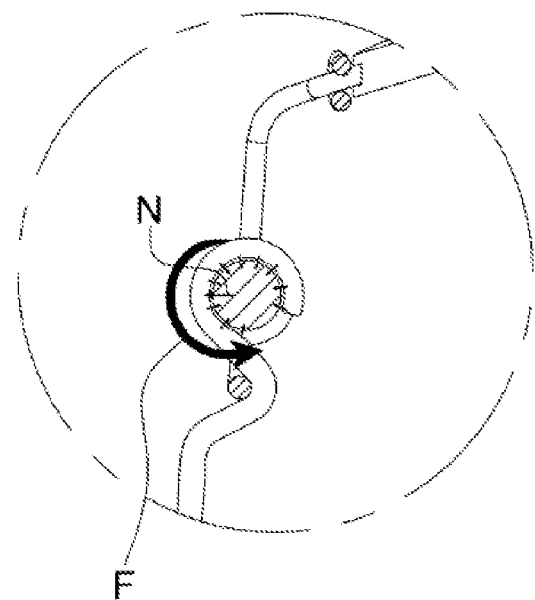
FIGS. 4(a) and 4(b) illustrate views comparing a polygonal support pillar with a circular support pillar in the cross-sectional shape of the eyeglass hinge.
Figure 4B:
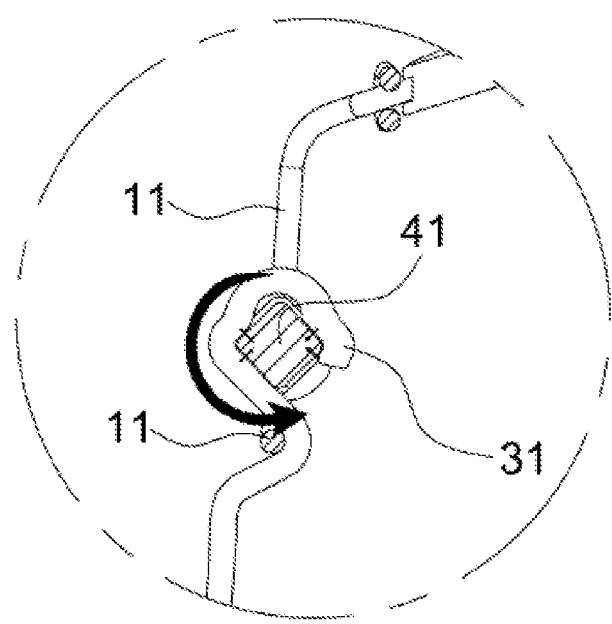
Figure 5:
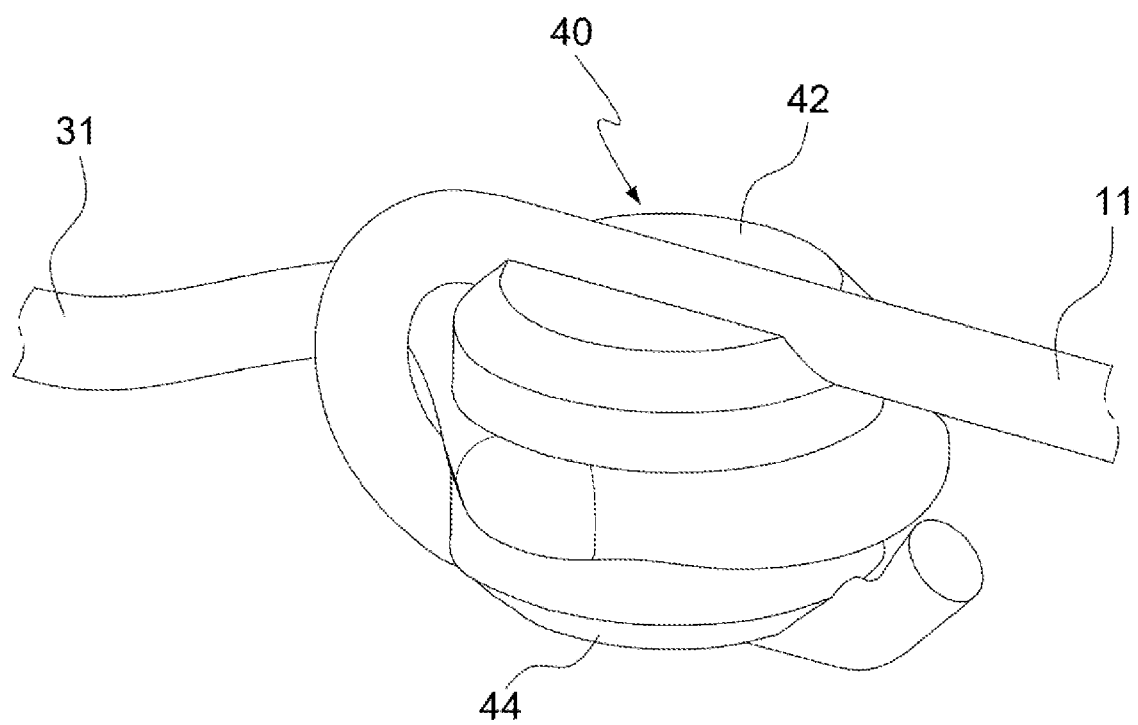
FIG. 5 is a view illustrating, in detail, the state of the glasses with screwless hinges coupled according to the first embodiment of the present disclosure.
Figure 6A:
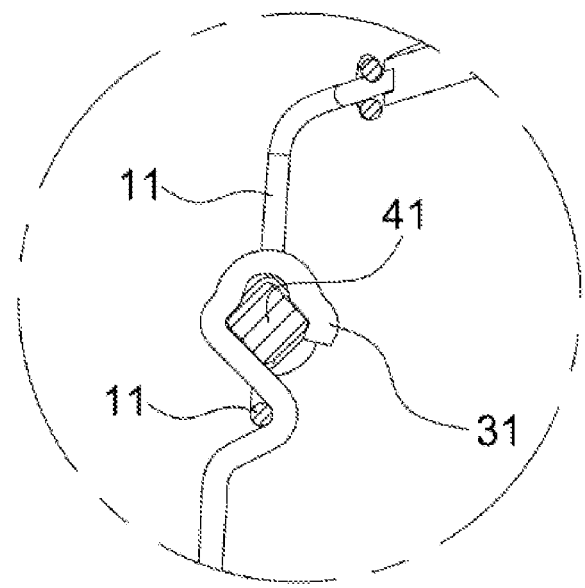
FIGS. 6(a) and 6(b) illustrate horizontal cross-sectional views of the glasses with screwless hinges according to the first embodiment of the present disclosure.
Figure 6B:
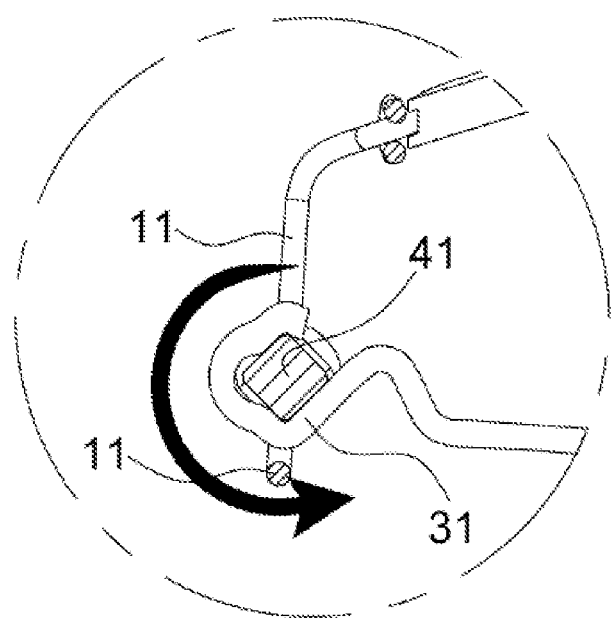

FIGS. 4(a) and 4(b) illustrates views comparing a polygonal support pillar with a circular support pillar in the cross-sectional shape of the eyeglass hinge, FIG. 5 is a view illustrating, in detail, the state of the glasses with screwless hinges coupled according to the first embodiment of the present disclosure, and FIGS. 6(a) and 6(b) illustrate horizontal cross-sectional views of the glasses with screwless hinges according to the first embodiment of the present disclosure.

Figure 7:
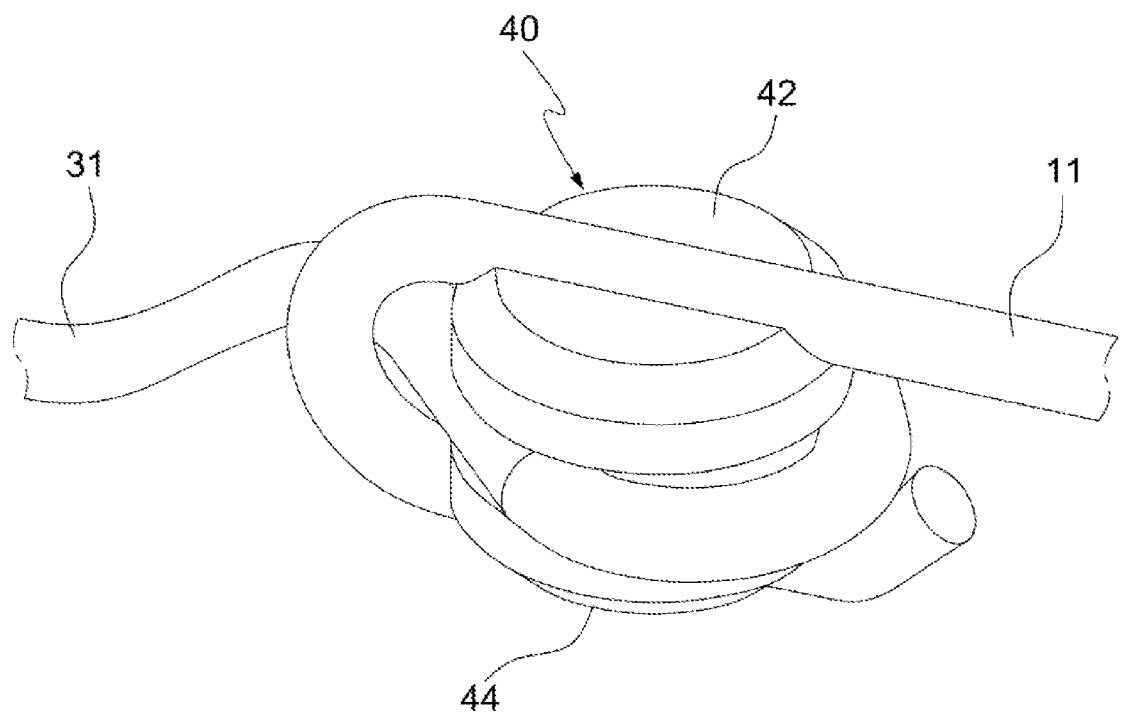
FIG. 7 is a view illustrating, in detail, the state of the glasses with screwless hinges coupled according to a second embodiment of the present disclosure.
Figure 8A:
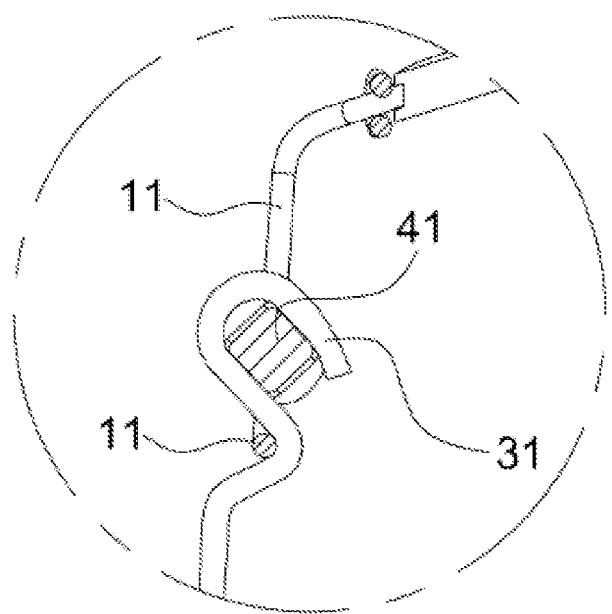
FIGS. 8(a) and 8(b) illustrates horizontal cross-sectional views of the glasses with screwless hinges according to the second embodiment of the present disclosure.
Figure 8B:
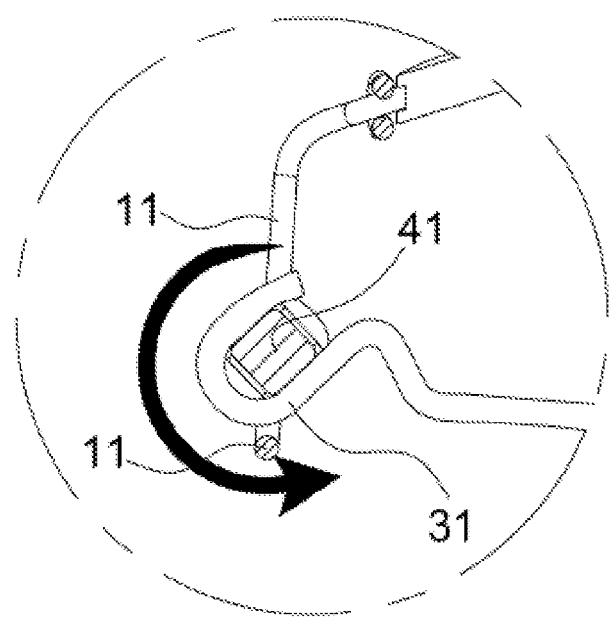

FIG. 7 is a view illustrating, in detail, the state of the glasses with screwless hinges coupled according to a second embodiment of the present disclosure, and FIGS. 8(a) and 8(b) illustrate horizontal cross-sectional views of the glasses with screwless hinges according to the second embodiment of the present disclosure.

The following description will be made with reference to FIGS. 4 to 8.

When the support pillar 41 according to the present disclosure is cut in a horizontal direction, the cut surface of the support pillar 41 is formed to have a polygonal cross section.

In the present disclosure, a reason for which the cross-sectional shape of the support pillar 41 is designed as a polygonal shape will be described in detail with reference to FIGS. 4(a) and 4(b).

The second connection part 31 is formed of thin wire.

When the support pillar 41 is formed in a cylindrical shape, the second connection part 31 surrounding the outer circumferential surface of the support pillar 41 is also bent in a circular shape and is coupled to the support pillar 41.

In this case, elastic forces acting in the radial direction of the support pillar 41 are generated on the outer circumferential surface of the support pillar 41, and the resultant force of repulsive forces against the elastic forces is referred to as N.

When a rotational force is generated around the circular support pillar 41 in the operations of folding and unfolding the temple 30 by a user, a frictional force F is generated between the support pillar 41 and the second connection part 31.

When a friction coefficient is $\mu$, the magnitude of the frictional force $F=\mu N$ acts proportionally to the magnitude of N.

That is, when a user repeatedly folds and unfolds the temple 30 for a long time, the elastic force of the second connection part 31 decreases, and the resultant force N also decreases in proportion thereto.

That is, the second connection part 31 cannot be securely coupled to the support pillar 41 only by elastic force. As a result, when used for a long time, the temple 30 is not securely coupled to the eyeglass hinge 40 but rattles and shakes.

In order to solve this problem, the glasses of the present disclosure are provided with a support pillar 41 having a polygonal shape.

By taking quadrangular support pillar 41 as example, the first and second embodiments will be described in detail. However, these embodiments are not limited thereto, but it is of course possible to adopt a support pillar 41 having various polygonal cross sections such as pentagons.

The second connection part 31 surrounds and is coupled to the outer peripheral surface of a quadrangular support pillar 41 by elastic force.

The second connection part 31 according to the first embodiment is continuously bent to surround and be coupled to two or more non-adjacent edges.

By forming the shape of the horizontal cross section of the support pillar 41 into a polygon, each of the edges of the polygon acts as a stopper when the second connection part 31 rotates. Accordingly, even if the elastic force of the second connection part 31 is somewhat reduced due to long-term use, a rotational force of a predetermined size or more is required to be applied to change the angle of the temple 30 unfolded, and thus the temple 30 can maintain a stable posture compared to the support pillar 41 with a circular cross section.

In this case, the second connection part 31 according to the first embodiment surrounds and is coupled to two non-adjacent edges formed on the outer peripheral surface of the support pillar 41. That is, the second connection part surrounds and is coupled to two facing edges of the quadrangular support pillar.

When the second connection part 31 according to the first embodiment holds all edges of the support pillar 41, a very large rotational force is required to rotate the second connection part 31.

That is, since each of the edges acts as a stopper, a greater rotational force is required when the second connection part 31 rotates. Accordingly, a user feels resistance when folding and unfolding the temple 30, and there is a risk that the temple 30 may break.

Accordingly, in the first embodiment according to the present disclosure, the second connection part surrounds and is coupled to the non-adjacent edges and is not in contact with edges adjacent thereto so that smooth folding and unfolding of the temple 30 can be performed.

As illustrated in FIG. 8(a), the second connection part 31 according to the second embodiment is bent in a U shape and surrounds and is coupled to the two parallel outer surfaces of a quadrangular support pillar 41.

As in the first embodiment, in the second embodiment, when the second connection part 31 rotates, two edges of the quadrangular support pillar 41 parallel to the temple 30 act as stoppers, thereby enabling the stable folding and unfolding of the temple 30.

When the second connection part 31 according to the second embodiment rotates, the second connection part 31 is in contact with two edges acting as stoppers and at the same time, is opened slightly by an elastic force to be rotated.

As illustrated in FIG. 8(b), when the temple 30 is folded by rotating the second connection part 31, the temple is maintained to be folded by pressing two remaining parallel surfaces.

Accordingly, according to the present disclosure, when the second connection part 31 coupled to the outer peripheral surface of the support pillar 41 rotates, the quadrangular edges of the outer peripheral surface of the support pillar 41 act as stoppers, thereby preventing the shaking of the second connection part 31. That is, the temple 30 does not shake with respect to the quadrangular support pillar 41 and maintains a predetermined angle of the temple 30 unfolded.

Figure 9A:
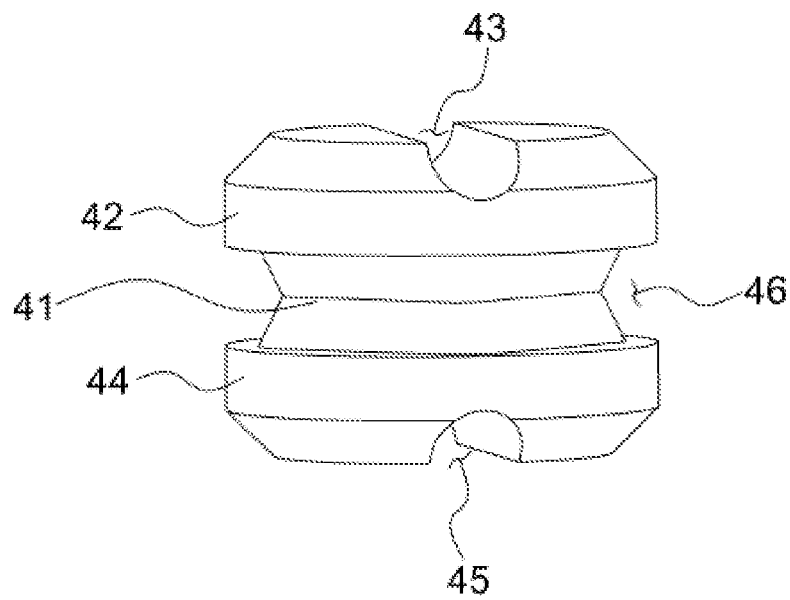
FIGS. 9(a) and 9(b) are modified embodiments of a winding groove according to the present disclosure.
Figure 9B:
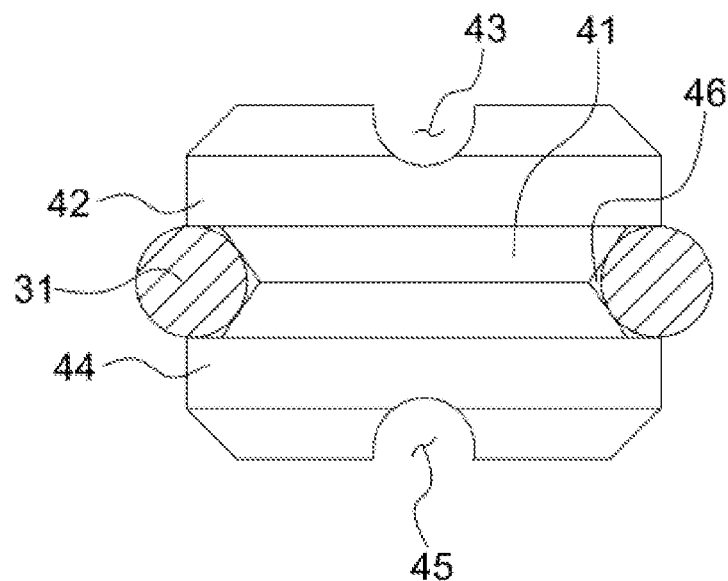

FIGS. 9(a) and 9(b) are modified embodiments of a winding groove 46 of the eyeglass hinge 40 according to the present disclosure.

The winding groove 46 is formed in the outer peripheral surface of the support pillar 41 according to the present disclosure.

Due to the repetitive motion of a user folding and unfolding the temple, friction occurs between the second connection part 31 and the outer surface of the support pillar 41.

When comparing a U-shaped winding groove 46 with a V-shaped winding groove 46, the second connection part 31 is in contact with the U-shaped winding groove 46 and thus a lot of friction therebetween occurs, but the second connection part 31 is in point contact with the V-shaped winding groove 46 and thus friction therebetween significantly decreases.

Accordingly, in the present disclosure, the winding groove 46 is formed in a v shape, and the second connection part 31 is in point contact with the winding groove 46 so as to minimize friction therebetween.

Figure 10A:
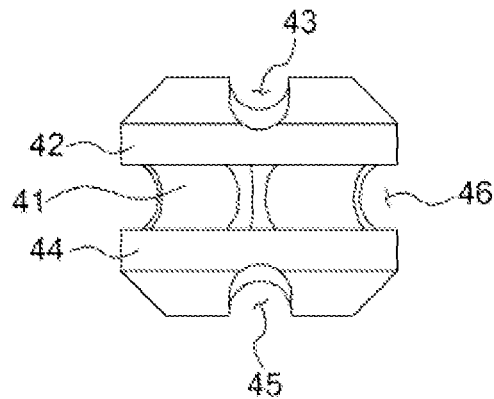
FIGS. 10(a), 10(b) and 10(c) are modified embodiments of an upper plate and a lower plate according to the present disclosure of the eyeglass hinge.
Figure 10B:
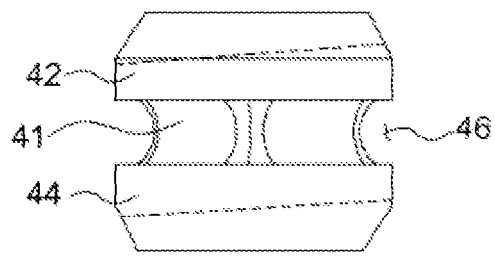
Figure 10C:
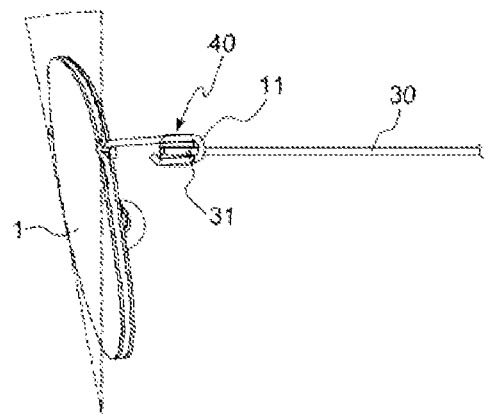

FIGS. 10(a), 10(b) and 10(c) are modified embodiments of the upper plate 42 and the lower plate 44 of the eyeglass hinge 40 according to the present disclosure. FIGS. 10(a) and 10(b) are side views of the modified embodiment of the upper plate 42 and the lower plate 44 viewed from directions different from each other, and FIG. 10(c) is a view illustrating a state in which the eyeglass hinge 40 of the modified embodiment is coupled to the temple 30 and the second connection part 31.

In general, a nose pad provided on glasses supports the nose. A Westerner has a different facial structure than an Asian, with the Westerner having a prominent forehead and a relatively high nose.

In consideration of this, in the present disclosure, each of the first fitting groove formed in the upper plate 42 and the second fitting groove formed in the lower plate 44 is formed to be inclined at a predetermined angle with respect to a horizontal direction.

When the first connection part 11 is coupled to the inclined first fitting groove and the inclined second fitting groove, the upper frame 10 is inclined as much as an inclined angle defined in each of the grooves so that glasses can be worn to suit the vision of a Westerner. That is, in the glasses of the present disclosure, by changing the angle of each of the first and second fitting grooves 45 of the eyeglass hinge 40, Westerners as well as Asians can wear the glasses. Accordingly, the hassle of having to redesign all the components of the glasses can be avoided, thereby improving productivity significantly.

The present disclosure relates generally to the glasses with screwless hinges without need for screw fastening. More particularly, the present disclosure relates to the glasses with screwless hinges in which the first connection part of an end part of the upper frame and the second connection part of an end part of the temple are fitted and coupled to the eyeglass hinge such that the first connection part and the second connection part intersect with each other so that the glasses can be easily assembled without need for screw fastening, and the support pillar coupled to the second connection part is formed to have a polygonal cross section so that the stable folding and unfolding of the temple are maintained despite repeated use thereof.

In the above, the exemplary embodiments of the present disclosure have been illustrated and described, but the present disclosure is not limited to the specific embodiments described above. Various modifications of the embodiments may be made by those of ordinary skill in the technical field to which the present disclosure belongs without departing from the gist of the present disclosure claimed in the claims. These modified embodiments should not be individually understood from the technical spirit or prospect of the present disclosure.

The invention claimed is:

1. Glasses with screwless hinges, the glasses comprising:
an upper frame supporting upper edges of lenses, wherein the upper frame includes a first connection part disposed on an end part thereof;
lower frames supporting lower edges of the lenses and coupled to the upper frame;
a temple configured to be folded and unfolded with respect to the upper frame, wherein the temple includes a second connection part disposed on an end part thereof; and
an eyeglass hinge connected to the first connection part and the second connection part
wherein the eyeglass hinge includes an upper plate, a lower plate, and a support pillar interposed therebetween and connected to the upper plate and the lower plate, the support pillar having a winding groove disposed on an outer peripheral surface thereof, the upper plate having a first fitting groove disposed on an upper surface thereof and the lower plate having a second fitting groove disposed on a lower surface thereof,
wherein the first connection part includes an upper straight portion fitted on the first fitting groove, a lower straight portion fitted on the second fitting groove, and a first curved portion connecting the upper straight portion and the lower straight portion, the first curved portion protruded from the upper straight portion and from the lower straight portion toward a first horizontal direction,
wherein the second connection part includes a straight portion, a second curved portion connected to the straight portion, and a hook portion connected to the second curved portion and fitted on the winding groove of the support pillar, the hook portion including a hook end portion, and a hook middle portion connected to the hook end portion and to the second curved portion,
wherein the hook middle portion is protruded from the hook end portion and from the second curved portion toward a second horizontal direction, the second curved portion is protruded from the straight portion and from the hook middle portion in a third horizontal direction which is opposite to the second horizontal direction, the first horizontal direction being orthogonal to the second and third directions when the temple is unfolded with respect to the upper frame, wherein the first curved portion has a first inner surface and the second curved portion has a second inner surface, the first inner surface of the first curved portion and the second inner surface of the second curved portion are in contact with other, and the first curved portion and the second curved portion are interlocked with each other at the first and second inner surfaces thereof, such that movement of the first connection part in the first horizontal direction is stopped by the second connection part, and wherein the first fitting groove and the second fitting groove are inclined at a predetermined angle with respect to the first horizontal direction.

2. The glasses of claim 1, wherein the second connection part surrounds and is coupled to at least two non-adjacent edges of the outer peripheral surface of the support pillar.

3. The glasses of claim 1, wherein the second connection part is bent in a U shape and is coupled to two parallel side surfaces of the support pillar.

4. The glasses of claim 1, wherein the winding groove is formed in a V shape, and the second connection part is in point contact with the winding groove so as to minimize friction therebetween.

\* \* \* \* \*